United States Patent [19]

Serapioni

[11] 4,337,756
[45] Jul. 6, 1982

[54] PANEL FOR COLLECTING SOLAR ENERGY WITH REDUCED LOSSES

[76] Inventor: Sergio Serapioni, Via S. Romedio, 1, Brentonico, Italy

[21] Appl. No.: 100,113

[22] Filed: Dec. 4, 1979

[30] Foreign Application Priority Data

Dec. 5, 1978 [IT] Italy ............................... 30537 A/78

[51] Int. Cl.³ ................................................ F24J 3/02
[52] U.S. Cl. .................................... 126/432; 126/417; 126/429; 126/435; 126/441; 126/444
[58] Field of Search ............... 126/417, 432, 428, 429, 126/431, 435, 441, 444

[56] References Cited

U.S. PATENT DOCUMENTS 2,680,437 6/1954 Miller ............................. 126/432 X
4,086,909 5/1978 Lyon et al. ........................... 126/432
4,126,270 11/1978 Hummel ......................... 126/432 X

*Primary Examiner*—Larry Jones

[57] ABSTRACT

Solar energy collecting panel, in particular for high temperatures, having a good efficiency substantially due to the reduction of the losses caused by radiation from the inner layers of the panel, at wavelengths to which the glass is transparent. The reduction of these losses is obtained by a panel construction comprising at least two inner parallel glass plates capable of defining air flow passages in parallel, at least with respect to the inner glass which is the nearest to the outer cover plate, in order to cool these air layers. The circulation of air within the panel can be of the forced type by means of an external fan, in a closed or open circuit, or due to convection air streams generated in contact with the absorbing plate at the panel bottom. In a particular embodiment the panel has a tubular shape, with the absorber surface, the inner glasses and the outer cover all cylindrical and coaxial.

7 Claims, 8 Drawing Figures

PANEL FOR COLLECTING SOLAR ENERGY WITH REDUCED LOSSES

BACKGROUND OF THE INVENTION

The present invention relates to a panel for picking up or collecting solar energy having reduced losses, especially of the frontal type, and therefore a better efficiency.

It is known, and it is becoming progressively more developed as an alternative source of energy, to utilize solar energy to obtain heating of fluids up to temperatures of about 80° C.

Conventionally this result is attained by collecting plates, for example black or blackened, to absorb solar radiation, and means to remove the heat therefrom, such as a system which circulates a fluid capable of exchanging the heat with the collecting plates and having a good thermal coefficient.

It is also known to improve the efficiency of these systems by forming panels with one or more plates of glass over the absorbing plates to produce a "greenhouse effect" which reduces the heat losses due to radiation from the hottest surfaces.

However, an excessively high number of glass plates overlying the absorbing surface would reduce, due to the unavoidable reflections, the incident energy to the absorber, thus reducing the resulting temperature.

On the other hand, if one tries to obtain higher temperatures through the utilization of indirect focusing of the solar rays (e.g. reflecting mirrors) or a direct focusing (e.g. convex glasses or of a special type such as to so-called Fresnel lenses) a decreased total efficiency is on the contrary met, this also without considering the inherent costs and the complex installation and maintenance operations required. It can be often observed that as the temperature obtained on the collecting plate increases, then efficiency decreases and it is impossible to obtain consistent flow rates of the heated fluid at substantially higher temperatures.

It is in fact known that the installations for the utilization of solar energy hitherto made have been almost exclusively limited to sanitary domestic uses, such as the supply of hot water, without being able to have those industrial applications which are generally desired, so that solar energy could be really considered an alternative and competitive energy source.

It could be stated that up to now the best total efficiency of the solar panels has been obtained through the technique of providing a vacuum therein, between the covering plate and the collecting bottom surface, but the slight improvement obtained does not justify the consequent increases in cost.

SUMMARY OF THE INVENTION

In an attempt to provide a solar energy collecting panel with a higher efficiency than the known solar panels and capable of reaching temperatures high enough, not only for the heating and the conditioning of buildings, but also for the thermodynamic conversion of the solar energy through the production of superheated water and steam for various industrial uses, it has been found that one of the major losses in these systems is due to a physical phenomenon, so far neglected, the consequences of which the present invention intends to obviate.

This is the following phenomenon: when the temperature of the collecting or picking up surface increases, all the layers of air intermediate said surface and the glasses above are heated to a temperature value approximating the temperature of the surrounding surfaces. As a consequence radiation in such wavelength bands is emitted to which the glass is transparent and therefore the above-mentioned greenhouse effect has only a partial effect. It is thought that mainly the asymmetric molecules present in the air, namely, almost exclusively $CO_2$ and $H_2O$, are responsible for the emission of radiation in wavelength bands to which the glass is transparent and, as will better be seen in the following also through a graphic representation, the importance of said emission increases as the temperature increases. When said gases, heated by the confining surfaces, reach temperatures higher than 60°-80° C., the quantity of energy emitted in the wavelength bands which the glass can not intercept, and therefore is lost, becomes the major portion of the total losses.

It is therefore an object of the present invention to provide a collecting panel having a high efficiency, mainly through the reduction of the losses due to radiation of the upper hot glass, but above all of the inner layers of air containing asymmetric molecules, said radiation being emitted at wavelengths to which the glass is transparent, said reduction being obtained in an economic manner.

It is another object of the present invention to provide a solar panel of the aforementioned type, particularly to be used at high temperatures, in which in addition to the reduction of said losses, there is obtained at the same time a reduction of the other losses usual in solar panels, in particular those due to convection.

These objects and advantages are obtained by a solar energy collecting panel substantially comprising, mounted on the same common support, a base absorbing surface to pick up the solar energy and, parallel thereto, a transparent covering plate, wherein, between said covering plate and said absorbing surface, parallel to both there are mounted at least two glass plates of a smaller surface area, such as to define between said covering plate and said base surface circuits of air streams with flows in parallel at least with respect to the inner glass plate adjacent to said cover plate and a return flow along said absorbing surface.

According to a particular aspect of the present invention, for panels of planar type, sometimes it is possible and preferable to utilize inner glass plates inside the panels having surface areas even substantially lower than the outer surface, and differentiated between each other with a "stepped" shape.

In a different embodiment the panel has on the contrary a tubular shape with the various elements cylindrical and coaxial.

The panel according to the present invention can be employed with air or water as primary fluid for the heat removal, as the conventional panels. The air circuit which has to be developed in the panel according to the present invention may be obtained, for "water" type panels, through a natural circulation as a consequence of the position and shape of the internal glasses and the temperatures of the absorber, or by means of a forced circulation system.

BRIEF DESCRIPTION OF THE DRAWINGS

These and other objects, advantages and characteristics of the present invention will be fully understood from the following detailed description of some embodiments thereof presented as non limiting examples, with reference to the attached drawings, in which.

DETAILED DESCRIPTION OF THE PREFERRED EMBODIMENT

Figure 1:
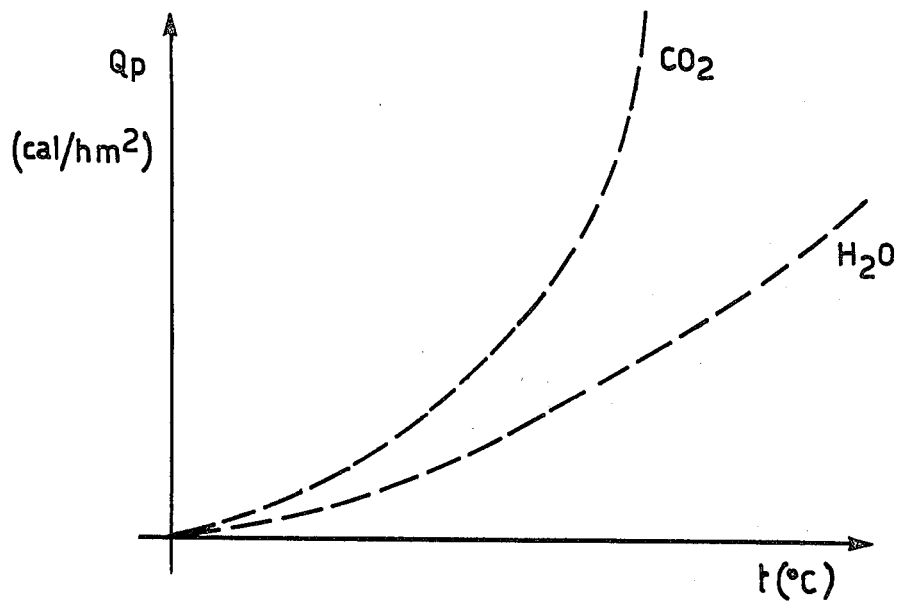
FIG. 1 shows a graph of the lost radiation, not captured by the glass as a function of the temperature, respectively for $CO_2$ and $H_2O$.

With reference to FIG. 1 the values of the radiation losses in a layer of hot air are represented as a function of the temperature, due respectively to the presence of asymmetric molecules such as $CO_2$ and $H_2O$. On the ordinate axis the values of $Q_P$ are represented, that is to say, the calories lost in 1 hour per $m^2$ of surface ($cal/hm^2$), which can also be calculated with a formula of the type:

$$Q_P = p^K l^H (A - Bt + Ct^2)$$

where
 t = temperature of the gas
 p = partial pressure of $H_2O$ or $CO_2$
 l = length of the path of the radiation through the gas.
 A, B, C, H, K: constants.

Thereby it results that said losses will be reduced, the lower will be kept the temperature of the intermediate air layers, which necessarily contain $CO_2$ and $H_2O$. Obviously it could be thought of proceeding in the sense of reducing the quantity of said molecules, thereby the p factor of the preceding formula, for example by making a vacuum within the panel but, as already stated above, such a solution was hitherto sometimes adopted but without solving this problem. It was uneconomical and difficult to put into practice.

On the contrary, according to the present invention, the aim is to keep the air layers above the absorbing base surface as cold (to reduce t) and as thin (to reduce l) as possible in order to minimize the losses due to radiation in radiation bands not intercepted by the glass. At the same time as a secondary and favourable effect, also the surfaces of the outer glass are cooled, thus lowering the frontal losses due to radiation and convection.

Figure 2:
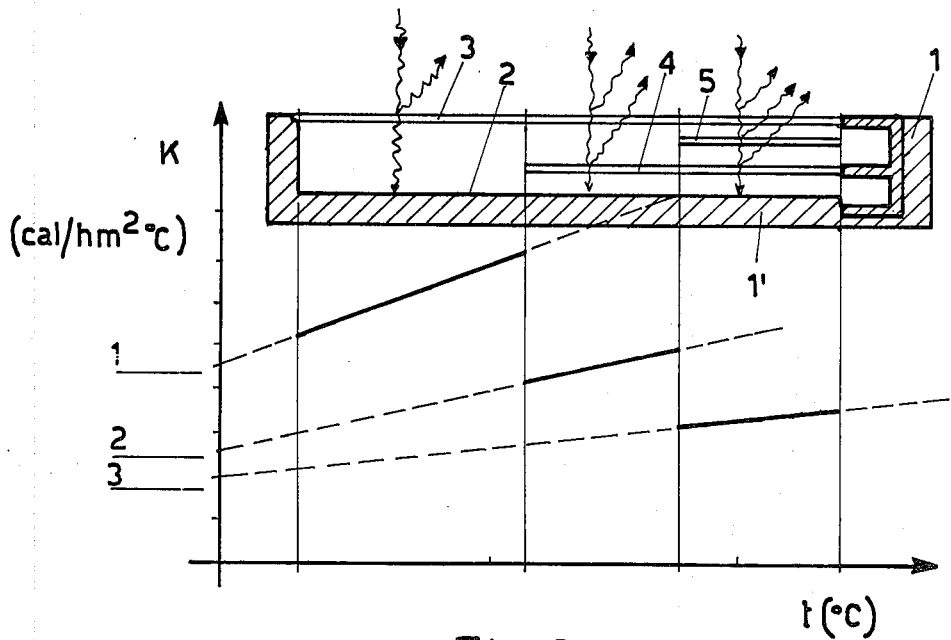
FIG. 2 shows a sectional view of a panel according to the present invention and the relative graph of the frontal transmission coefficient in correspondence with a different number of intermediate glasses.

With reference to FIG. 2, there is shown a solar panel according to the present invention comprising within a conventional support frame 1 an absorbing surface 2, for example blackened, with a substrate of insulating material 1', an upper plate 3 of glass or transparent plastic material and two intermediate glasses 4 and 5, parallel to surfaces 2 and 3, also being fixed to the support 1, but so as not to extend along the whole panel. Said intermediate glasses 4 and 5 (which could also be more than two) will therefore not cause air layers to be insulated from each other but to be in mutual communication. The underlying graph shows the different values of the frontal transmission coefficient K relating to the total losses due to radiation and convection as a function of the temperature, depending on as to whether above the absorbing surface 2 at the bottom of the panel there are one, two or three glass plates. It should be easily understood that the radiation losses from plate 2 decrease as the number of overlying layers of glass increase, which are to be passed through by the radiation when escaping to the outside. At the same time there will be an obvious reduction of the radiation entering and incident onto the collecting surface due to the multiple reflections at the intermediate glasses.

If the temperature of the surface 2 increases toward the right hand, i.e. in the direction of the arrow on the axis of the abscissae, it is immediately seen how it is convenient to increase the number of the glass plates in this direction and to leave on the contrary even only the upper glass plate where the temperature is the lowest. In fact it is preferable to facilitate the collection of energy in those portions where the absorbing surface is at a low temperature and the danger of radiation losses is minimal, while it is important that these losses be reduced where the collecting surface is at a high temperature and a fraction of the incident energy due to the reflection losses can be given up without prejudice, since these are negligible, with respect to the radiation losses in that zone already at high temperature. The full curve line obtained by joining the respective portions of the three graphs gives an advantageous solution of the problem, being an optimal compromise between the opposite requirements of keeping low both the reflection and the radiation losses.

Figure 3:
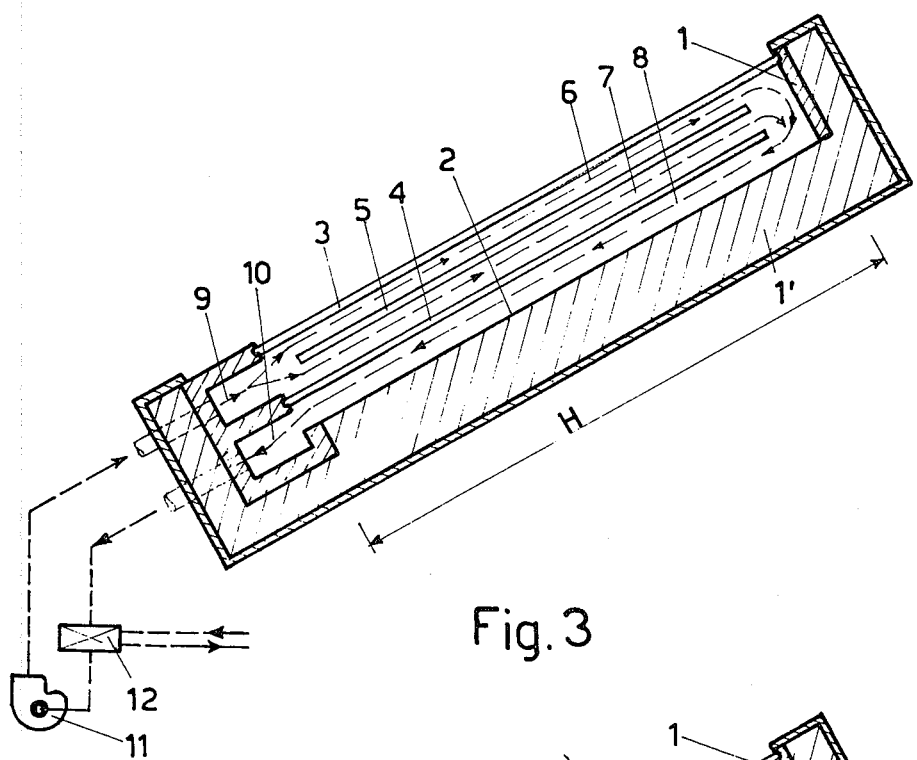
FIG. 3 shows a sectional view of an "air" type panel according to the present invention, with a forced circulation circuit through the inside thereof.

With reference to FIG. 3, there is shown more in detail an example of an "air" type panel embodiment according to the present invention, i.e. a panel in which the primary heat removal fluid consists of air. In the drawing, elements corresponding to those of FIG. 2 are indicated with the same reference numerals, while 6, 7 and 8 designate the three air layers defined respectively from the outside toward the inside, between the upper plate 3 and the glass 5, between this and the glass 4, and between the latter and the absorbing surface 2.

There is provided a forced circulation system, by means of a fan or pump 11, either of an open circuit type, with a continuous inlet of air taken from the outside such as through a collector 9 and direct utilization of the air at the outlet, e.g. from a discharge collector 10, or as shown in the drawings, of a closed circuit type to convey the absorbed heat to a secondary fluid of utilization, such as water to be vaporized, through a heat exchanger 12 in the circuit. In both cases the air is brought into contact (sucked or blown) with the absorbing surface 2, increases its own temperature and conveys to the outside the heat which can then be utilized. With some arrows has been indicated the path of the air and it is to be noted that the two outer layers 6 and 7 form two passages in parallel into which the entering air is divided, passing through the inlet collector 9, while the passage or layer 8 is connected with the outlet connector 10. Both collectors 9 and 10 which can also consist only of a number of holes each communicating with the outside, are provided at the same side of the housing-support 1 and in particular the collector 9 is such as to afford a good distribution of the air so that it will flow between the intermediate glasses with the best uniformity possible.

It should be noted that the adoption of a closed cycle as illustrated has the advantage that there can be introduced in circulation air conveniently depleted of $CO_2$ and $H_2O$ in order to reduce the radiation losses represented in FIG. 1. There is also the additional advantage of reducing the dust in circulation, thus avoiding possible deposits at the inside of the panel, with no need of filters, but the open circuit embodiment is simpler and may be preferable in certain utilizations.

As shown in FIG. 3, the air entering through collector 9 is divided into the two passages 6 and 7 separated by the glass 5 and then recombines at the inlet of passage 8 through which it flows up to the outlet 10 along the absorbing surface 2 which, protected by the three glass surfaces 3, 4 and 5, can reach temperatures higher than 200° C. according to the intensity of the solar radiation, without or with auxiliary concentrating means. The temperature of the air at the outlet 10 will be more or less near the temperature of the surface 2 depending on the stream speed through 8, therefore the flow rate of the air which flows into the panel propelled or taken in by fan 11. Obviously in the two conduits 6 and 7 the temperature of the air cannot be much higher than the external temperature since, even if the air absorbs the heat from the surrounding surfaces and a main fraction of the energy supplied by the hottest air layer 8, which is then recycled, it is continuously renewed with cold air, and thus the outward radiation due to $CO_2$ and $H_2O$ will be at a minimum (FIG. 1). Therefore the greenhouse effect to capture the radiation emitted by the hot layer 8 is assured in this case not only by the overlying glass surfaces, but also by the air layers 6 and 7 which absorb more energy than they radiate, energy which then returns into the cycle with a resulting efficiency increase.

At the same time, the surface of the covering plate 3 is also cooled since it is contacted by the air stream 6 from the outside, passing thereunder, thereby the convection and radiation losses of the external glass will also be reduced, with a recovery of heat and consequently with a further increase in the overall efficiency. The intermediate glasses 4 and 5 will have thin commercial thicknesses of 1.2 to 1.8 mm not only by reason of reducing their costs, but also to improve the transmission of the energy radiated by the sun, as well as to reduce the thermal inertia of the panel, while the covering plate may be a glass or a transparent plastic material having a thickness of 3-5 mm.

The thickness of the air layers, i.e. the distances to be employed between the various surfaces, are generally in the range of 1-12 mm, when the higher values are preferred in the natural circulation embodiment which will be described in the following. These distances will be preferably of about 2-10 mm between the cover plate 3 and the glass 5 and between this latter and the glass 4, and of about 1-5 mm between the glass 4 and the absorbing bottom surface. However other values could also be adopted, bearing in mind that such thickness or distances must be reduced as much as possible to obtain a low value of "l" in the foregoing formula relating to FIG. 1. A limit to the reduction of thickness of the air layers is given only by the possibility of having uniform air streams of the laminar type.

The absorbing or collecting surface 2 may be of a very thin metallic plate treated so as to maximize its absorption coefficient on the side exposed to the sun, e.g. with a mat black paint, possibly in a selective manner. The portion 1' is made of typical insulating materials, such as rock wool or the like, of a thickness such as to minimize the lateral and rearward losses of the panel. The longitudinal size H may be conveniently between about 400 and 1,000 mm, while in a transverse direction the size may be whichever.

Experimentally it has been found that with this type of panel the air temperature at the outlet of the conduit 10 may be higher than 130° C. and even reach 200° C. with the aid of concentrators using a plurality of reflecting mirrors. The efficiency, with an air flow rate of 10–40 $m^3/hm^2$ is more than 50% to attain a 70% value under particularly favourable conditions.

Figure 4:
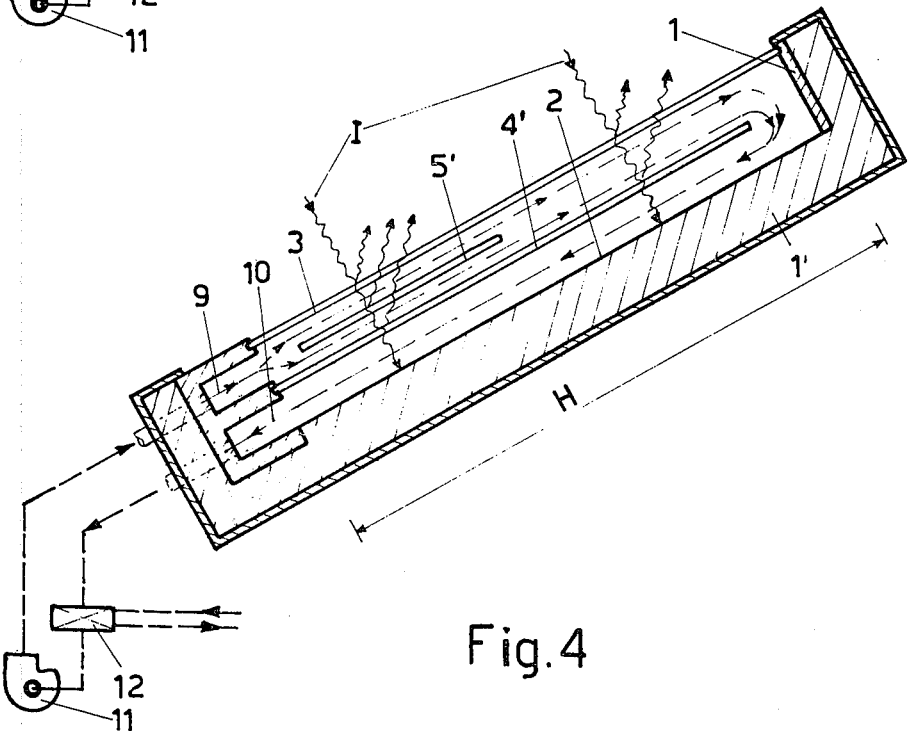
FIG. 4 shows again a sectional view of a panel, as in FIG. 3, but with intermediate glasses of different size.

Referring now to FIG. 4, the same "air" type panel is shown again, with inner glasses having reduced size to avoid, at least for a certain zone of the panel, that a fraction of the sun radiation will be lost and does not reach the absorbing surface due to reflections, as already explained with reference to FIG. 2.

Both for the panel represented in FIG. 3, and for the one of FIG. 4 no description of the junction of the glasses to the metal container (generally made of galvanized sheet iron or aluminium) is given, being obvious, or of the spacers between the glasses, formed for example with beads of plastics, wood or rubber, or of the inlet and outlet air collectors (not necessarily present, as stated above) which are available in the trade.

Figure 5:
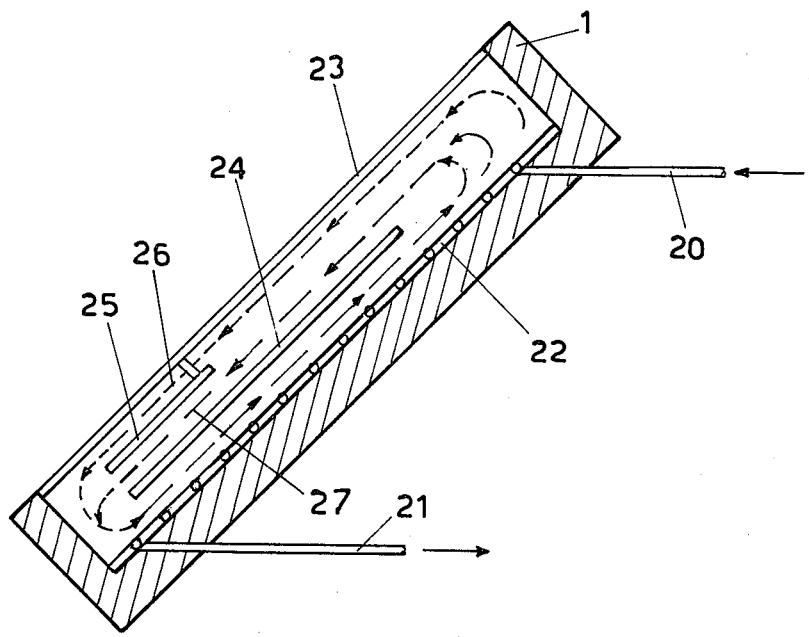
FIG. 5 shows a sectional view of a "water" type panel according to the present invention.

Referring now to FIG. 5, there is shown a panel according to the present invention of the "water" type, i.e. a panel in which the absorbing surface, consisting of a blackened metal sheet such as previously described, exchanges the heat with tubes incorporated therein, through which a liquid (usually water) flows, or else consists simply of a so-called "roll-bond" plate comprising sheet and tubes. In the embodiment illustrated, the panel consists of a bottom "roll-bond" sheet 22, with a covering sheet 23 and two intermediate glasses 24 and 25, of reduced size, the whole housed within a support-container 1 comprising also the necessary insulation means. The tubes within the plate 22 form a continuous passage for a liquid, usually water, which must convey the absorbed heat to the outside for utilization. There are therefore provided an inlet duct 20 for the feeding of the liquid and an outlet duct 21 for the transmission to the utilization point.

The air contained at the inside of the panel, which heats near the bottom 22, generates a natural circulation in the passages 26 and 27 in the direction of the arrows indicated in the drawing and consequently with the same advantages already mentioned with reference to FIG. 3 as to the reduction of the losses due mainly to radiation and secondarily to convection.

It will be appreciated that with an arrangement of the glasses as shown in the figure and a suitable inclination of the panel, which is also necessary for the best orientation toward the sun at these latitudes, the high temperatures which would be created in the air layers 26, 27 closest to plate 22 and which would cause radiation losses (of $CO_2$ and $H_2O$ as seen above), can not take place because of the circulation through natural convection of the air which carries the hottest layer into contact with the colder zone of the absorbing plate. For this purpose the longitudinal size of the panel must be in the order of 1 m and the circulation of the fluid in the tubes of the plate 22 must be such that the cold inlet duct 20 is located on the upper part of the panel and the hot outlet duct 21 on the lower part thereof. There is thus created in the absorbing plate a cold upper zone, where there is only the covering plate 23 to facilitate the incidence of energy onto plate 22, the low temperature of which does not cause great radiation losses, and a warm lower zone, where the presence of the intermediate glasses reduces the radiation losses toward the outside.

It should be also understood that the "step-like" arrangement given to the inside glasses has the double function of promoting the natural circulation of the air in the panel while creating parallel flows at both sides of the inner glass 25, thus reducing the radiation losses in the zones at higher temperature and the reflection losses in the colder zones, thereby the resulting operation of the panel is optimized.

Figure 6:
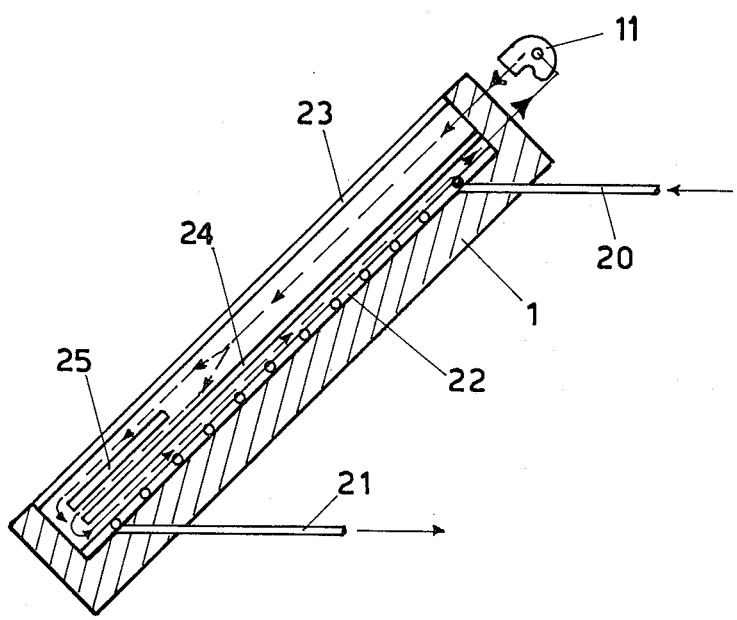
FIG. 6 shows a sectional view of a panel as in FIG. 5, but with forced circulation of air through the inside thereof.

With reference to FIG. 6, there is shown another "water" type panel according to the present invention, in which the forced circulation of air in the inside thereof is effected by means of a fan, as in FIG. 3. Some numerals correspond to the same parts of FIG. 5 and it is seen that with the fan 26 the panel, even if slightly more complicated and expensive, will on the other hand benefit from a more efficient cooling effect of the circulating air. Also the energy picked up by the air during its movement within the panel could be possibly utilized by means of a suitable heat exchanger. Of course the panel in this case will be of the "closed circuit" type, whereas in the embodiment of FIG. 3 it could be of the "open circuit" type for the direct utilization of the absorbed heat.

All the other comments made previously for the embodiment of FIG. 5 are still valid bearing in mind that in this case it is not absolutely necessary that the water circulates in the panel from the upper to the lower part since natural convection streams must not be created now, provided that the panel inlet is located in the zone covered by the least number of glasses above.

Figure 7:
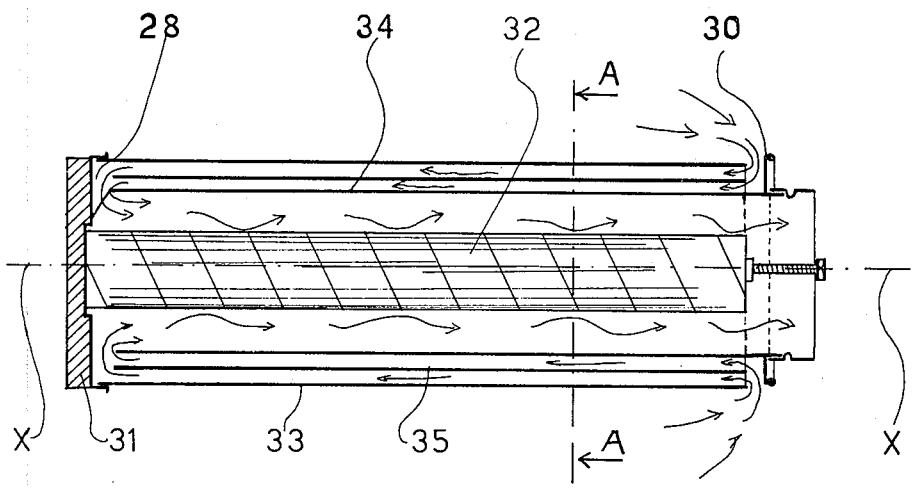
FIG. 7 shows a longitudinal sectional view of a tubular-shape embodiment of the solar panel according to the invention.
Figure 8:
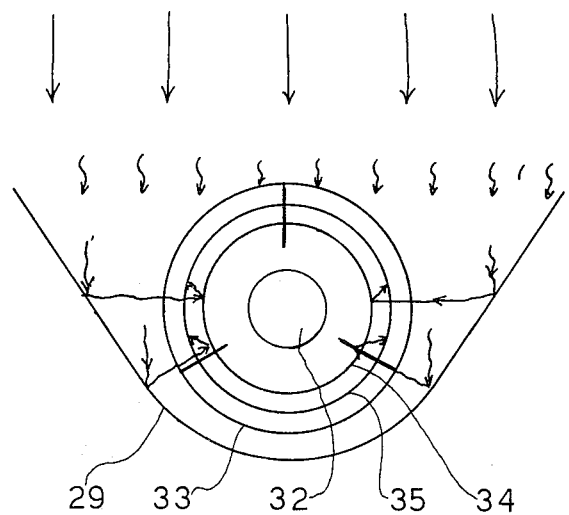
FIG. 8 shows a cross-sectional view along the line A—A of the panel of FIG. 7 positioned in the focus of a parabolic reflector.

Referring now to FIGS. 7 and 8, a different construction of the panel according to the invention is represented, similar to the shape of the so-called "heat tubes" already known, but such as to show the features and advantages of the present invention. The absorbing or picking up surface is now a tubular sheet 32 having an axis X—X. The intermediate glass plates 34, 35 and the covering member 33 are also cylindrical and coaxial with the inner absorber 32, having maintained the features of parallelism and longitudinal size for the inner air circuit. FIG. 7 shows an embodiment corresponding to the "planar" arrangement of FIG. 3, but a step-like arrangement as in FIG. 4 could also be adopted. Of course in this case there is no need of an angular positioning of the panel. The air is sucked by a fan or a pump (not shown) from the outside in the panel through proper holes formed in a flange 30 at an end of the tubular panel, which also connects in an insulated manner the hot air flowing out from the panel with a header in common with other panels to convey the hot air to utilization. No collectors 9 and 10 are provided. At the opposite end of the panel an insulating support plug 31 is formed with spacers 28 preferably at 120° C. from each other to keep the intermediate glass tubes 34, 35 at a suitable prefixed distance.

As shown in particular in FIG. 8, this tubular panel may be advantageously positioned in the focus zone of a parabolic reflector 29.

Possible actions, modifications or variations may be made by those skilled in the art to the embodiments of the collecting panel here described and illustrated according to the present invention, without departing from its scope as defined by the appended claims.

What I claim is:

1. A panel for collecting solar energy, comprising on a common support: a base absorbing surface, a flat transparent cover plate parallel thereto, and first and second intermediate glass plates between and parallel to said absorbing surface and said cover plate, said first glass plate being closer to said cover plate than said second glass plate, an air inlet and an air outlet, said air inlet positioned adjacent said first plate and means for flowing an air stream from said air inlet so as to flow along both sides of said first glass plate and to join again downstream of said first glass plate and then flow between said second glass plate and said absorbing surface and flow to said air outlet downstream of said absorbing surface, the distance between said base absorbing surface and said second glass plate being less than the distance between said intermediate glass plates or between the cover plate and said first intermediate glass plate.

2. A panel according to claim 1, comprising in addition on the same side thereof collecting chamber respectively for the inlet and outlet of an air flow caused by a fan of a forced circulation system.

3. A panel according to claim 2, wherein said collecting chamber are merely holes formed laterally in said support.

4. A panel according to claim 1, wherein all the distances between the intermediate glass plates and between said glass plates and, respectively the covering plate and the absorbing surface are in the range of 1–12 mm.

5. A panel according to claim 4, wherein the distances between the covering plate and the adjacent intermediate glass plate and between two adjacent intermediate glass plates are in the range of 2–10 mm.

6. A panel for collecting solar energy, comprising on a common support: a base absorbing surface, a flat transparent cover plate parallel thereto, and first and second intermediate glass plates between and parallel to said absorbing surface and said cover plate, said first glass plate being closer to said cover plate than said second glass plate, and means for flowing a fluid comprising air depleted of $CO_2$ and of $H_2O$ within the panel from an air inlet and to divide in front of said first glass plate so as to flow along both sides of said first glass plate and to join again downstream of said first glass plate and flow to an air outlet downstream of said absorbing surface, the distance between said base absorbing surface and said second glass plate being less than the distance between said intermediate glass plates or between the cover plate and said first intermediate glass plate.

7. A panel for collecting solar energy, comprising on a common support: a base absorbing surface, a flat transparent cover plate parallel thereto, and first and second intermediate glass plates between and parallel to said absorbing surface and said cover plate, said first glass plate being closer to said cover plate than said second glass plate, and means for causing an air stream to flow within the panel from an air inlet and to divide in front of said first glass plate so as to flow along both sides of said first glass plate and to join again downstream of said first glass plate and flow to an air outlet downstream of said absorbing surface, the distance between said base absorbing surface and said second glass plate being less than the distance between said intermediate glass plates or between the cover plate and said first intermediate glass plate, the distances between the intermediate glass plates and between said glass plates and respectively said cover plate and said absorbing surface being in the range from 1 to 12 mm, and the distance between said absorbing surface and said second glass plate being in the range of from 1 to 5 mm.

* * * * *